United States Patent [19]
Collins et al.

[11] Patent Number: 5,972,078
[45] Date of Patent: *Oct. 26, 1999

[54] EXHAUST RINSE MANIFOLD FOR USE WITH A COATING APPARATUS

[75] Inventors: Jimmy D. Collins, Allen; Steven G. Tollefson, Dallas, both of Tex.

[73] Assignee: FSI International, Inc., Chaska, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/903,572

[22] Filed: Jul. 31, 1997

[51] Int. Cl.⁶ .................................................. B01D 47/06
[52] U.S. Cl. ............................. 95/224; 96/273; 96/327; 96/361; 118/61; 438/905
[58] Field of Search .............................. 55/385.1, 385.2; 95/214, 224; 96/322, 327, 361, 363, 271, 272, 273; 438/905, 909; 118/61, 70

[56] References Cited

U.S. PATENT DOCUMENTS

| | | | |
|---|---|---|---|
| 3,760,822 | 9/1973 | Evans | 134/99 |
| 4,615,294 | 10/1986 | Scapple et al. | 118/50.1 |
| 4,699,805 | 10/1987 | Seelbach et al. | 437/245 |
| 4,761,269 | 8/1988 | Conger et al. | 422/245 |
| 4,835,114 | 5/1989 | Satou et al. | 438/905 |
| 4,910,042 | 3/1990 | Hokynar | 438/905 |
| 4,981,722 | 1/1991 | Möller et al. | 427/248.1 |
| 4,989,540 | 2/1991 | Fuse et al. | 118/719 |
| 4,993,358 | 2/1991 | Mahawili | 118/715 |
| 5,000,113 | 3/1991 | Wang et al. | 118/723 |
| 5,039,321 | 8/1991 | Satoh et al. | 55/385.2 |
| 5,088,913 | 2/1992 | Chambers | 95/224 |
| 5,123,936 | 6/1992 | Stone et al. | 55/8 |
| 5,221,556 | 6/1993 | Hawkins et al. | 427/255 |
| 5,312,487 | 5/1994 | Akimoto et al. | 118/70 |
| 5,350,336 | 9/1994 | Chen et al. | 55/385.2 |
| 5,384,044 | 1/1995 | Burgess | 210/346 |
| 5,411,590 | 5/1995 | Hawkins et al. | 118/715 |
| 5,472,502 | 12/1995 | Batchelder | 118/52 |
| 5,494,501 | 2/1996 | Anspach et al. | 96/208 |
| 5,522,412 | 6/1996 | Ohba et al. | 118/70 |
| 5,529,626 | 6/1996 | Stewart | 118/70 |
| 5,536,319 | 7/1996 | Wary et al. | 118/719 |
| 5,584,963 | 12/1996 | Takahashi | 438/905 |
| 5,688,322 | 11/1997 | Motoda et al. | 118/52 |
| 5,743,939 | 4/1998 | Lee et al. | 95/214 |

FOREIGN PATENT DOCUMENTS

| | | |
|---|---|---|
| 61-239625 | 10/1986 | Japan. |
| 2-198131 | 8/1990 | Japan. |

*Primary Examiner*—Duane S. Smith
*Attorney, Agent, or Firm*—Faegre & Benson LLP

[57] ABSTRACT

Exhaust components of a coating apparatus can be cleaned to remove coating material therein and/or can be periodically treated so as to prevent the buildup of coating material with exhaust components. Moreover, coating materials and cleaning liquids can be separated from the exhaust stream and collected to a drain. An exhaust manifold includes an integral rinsing mechanism and a fluid separator. Rinsing can be controlled automatically or manually.

24 Claims, 8 Drawing Sheets

5,972,078

EXHAUST RINSE MANIFOLD FOR USE WITH A COATING APPARATUS

TECHNICAL FIELD

The present invention relates to an exhaust manifold usable with a coating apparatus including a rinse mechanism for supplying cleaning fluid within the exhaust manifold for removing and preventing buildup of coating material from the coating apparatus. More specifically, the exhaust rinse mechanism of the present invention is particularly applicable to a spinner-type coating apparatus for coating semiconductor wafers.

BACKGROUND OF THE INVENTION

The present invention has been developed for its particular applicability to the processing of semiconductor wafers. Semiconductor wafers must be processed in an extremely clean environment and process liquids and coatings must be very accurately applied.

Processing fluids and coatings include, for example, liquid resist materials which are subsequently patterned to create electrical circuit features, and other coatings such as anti-reflective coatings. Resist materials typically include organic solvents while other coatings may be soluble organically or in water. One common water soluble top anti-reflective coating is known as Aquatar™ which is available from AZ Photoresist Products, a division of Hoechst Celanese Corporation of Somerville, N.J.

Semiconductor wafers are typically coated within a coating apparatus known as a spinner or spin-coater. A spin-coat process is performed within a process chamber, wherein a rotatable chuck is driven with a semiconductor wafer supported thereon while process fluid is deposited onto the surface of the wafer. The process chamber is also exhausted, preferably by a negative pressure system, through an exhaust system. During the spin-coat process, process fluid is ejected from the wafer surface onto a cup assembly, typically provided within the process chamber, and airborne process fluid and particles are exhausted through the exhaust system. This process fluid may subsequently deposit and dry on the surfaces of the cup assembly and the exhaust system. This dried process fluid can provide potential contaminants within the coating process.

It is desirable to maintain the spin-coat process chamber as clean as possible. In this regard, developments have been made for periodically cleaning the internal surfaces of the process chamber. For example, in U.S. Pat. No. 5,312,487 to Akimoto et al, several methods and devices are disclosed for applying cleaning or rinsing fluid to the internal surfaces of the container making up the process chamber. The purpose is to reduce the potential of contaminants being introduced from the process chamber onto a subsequently coated wafer. The coating materials as well as the washing liquids are exhausted through a conventional exhaust system and/or its drain.

Other cleaning systems have also been developed for use within a process chamber for the purpose of cleaning the back side of a semiconductor wafer after it is coated. Specifically, cleaning fluid is directed against the wafer back side with a controlled airflow over the wafer and into the exhaust system for cleaning the wafer back side and exhausting the removed particles and cleaning liquid. An example of this type of apparatus is disclosed in U.S. Pat. No. 5,529,626 to Stewart.

In these prior art systems, however, the coating fluids and cleaning liquids entrained within the airflow are carried into the exhaust system. An exhaust system will typically include exhaust manifolds and exhaust control mechanisms for controlling airflow. As the process fluid becomes airborne and is carried into the exhaust system, an incremental buildup of the process fluid on the exhaust system parts occurs. This incremental buildup can affect exhaust control performance by disturbing the requisite airflow normally controlled by a control valve and can eventually result in a restricting of the airflow passage altogether.

Exhaust systems also typically include a butterfly type valve as an airflow control valve for setting the requisite airflow desired for a particular coating application. Flat screens are also typically provided within the exhaust system for catching larger particles within the exhaust system, such as broken wafer pieces in the event of a wafer mishap in the spinner, to prevent damage to the exhaust system. These butterfly type valves and screens are also subject to the incremental buildup of process material carried within the exhaust.

Thus, exhaust systems typically require periodic disassembly and cleaning. However, periodic disassembly and cleaning is disadvantageous not only due to the downtime of the coating apparatus, but also in that disassembly compromises the system integrity by introducing the potential for particles to be introduced into the system.

Cleaning processes, such as described in the aforementioned U.S. Pat. Nos. 5,312,487 and 5,529,626, are beneficial to the exhaust system in the sense that cleaning or rinsing fluids are also carried into the exhaust system on a periodic basis. However, the airborne fluids within the exhaust during such cleaning processes also include the airborne coating materials. Thus, any benefit is relatively minimal. Another way to clean the exhaust system is to simply periodically dump solvents or cleaning fluids within the cup of the spinner assembly so that the fluid flows through the exhaust system for cleaning it. Such a procedure can be performed on a periodic basis also to prevent buildup of coating materials within the exhaust system. However, such a procedure still requires maintenance time and for an operator to manually dump the cleaning fluids within the apparatus. Moreover, a relatively large amount of cleaning fluid is required in order to ensure that all contaminated surfaces of the exhaust system are adequately cleaned. Then, all the cleaning fluid must be handled throughout the exhaust system.

Alternatively, obstructions to the flow of the exhaust air including airborne coating material can be eliminated. Items such as butterfly type control valves and screens can obstruct the airflow, particularly after a buildup of coating material thereon. These items may simply be removed from the exhaust stream. However, the clear disadvantage is the loss of control of the airflow and/or the safeguard features provided thereby. Moreover, at some point, the piping may still require cleaning.

SUMMARY OF THE INVENTION

By the present invention, exhaust components of a coating apparatus can be cleaned to remove coating material therein and/or can be periodically treated so as to prevent the buildup of coating material within the exhaust components. The cleaning process can be accomplished manually or automatically as needed or on a regular cycle basis. Moreover, not only can the exhaust components be cleaned, coating fluids and cleaning liquids can be separated from the exhaust stream and collected to a drain.

More specifically, the present invention is directed to an exhaust manifold to be connected to a coating apparatus, wherein the exhaust manifold includes an integral rinsing mechanism as well as a fluid separator. The rinse mechanism comprises perforated rinse tubes running coaxial to exhaust pipes of the exhaust manifold. Cleaning solution can be pumped through the perforated rinse tubes under controlled pressure and flow rate. Thus, cleaning solution can be applied to the internal surfaces of the exhaust pipes. The fluid separator includes a screen design, preferably a tapered design, that does not degrade exhaust flow yet sheds liquid into a fluid trap which drains into an existing process fluid drain. Thus, exhaust pipe rinsing can be utilized to maintain exhaust performance while the coating apparatus is running. The frequency and amount of rinsing is preferably adjustable. Moreover, no disassembly of the exhaust system is required for the cleaning operation.

The aforementioned advantages are achieved by an exhaust manifold to be connected to such a coating apparatus and through which the exhaust stream from the coating apparatus passes, the exhaust manifold having at least one exhaust conduit, an end of which is connectable to the coating apparatus, and a rinse tube running within the exhaust conduit over at least a portion of its length, the rinse tube having an end connectable to a clean solution supply and including plural perforations or orifices along its length so cleaning solution can be dispensed from the orifices to impinge at least a portion of the interior surface of the exhaust conduit. Preferably, a fluid separator device is also provided downstream from the exhaust manifold for removing fluid from the exhaust stream, collecting the removed fluid and draining the collected fluid. The separated fluid may be coating material and/or cleaning solution.

In accordance with a preferred embodiment, the exhaust manifold comprises a collector body defining an internal cavity wherein plural exhaust conduits are connected to the collector body. At the top of the collector body, a supply manifold is provided which connects with plural rinse tubes one rinse tube for each exhaust conduit. Also, passages within the supply manifold provide connection for the cleaning solution to pass to each rinse tube, and also to supply cleaning solution to at least one, but preferably a series of, nozzles arranged along a surface of the supply manifold. The nozzles preferably are positioned to spray cleaning solution onto the fluid separator device. The fluid separator preferably comprises a tapered screen assembly supported by a fluid trap wherein the fluid trap is directly connected to the collector body. The fluid trap itself comprises an annular element having an annular recess, wherein the tapered screen assembly sits within the annular recess so that separated fluid accumulates or collects within the recess and is drained through an opening of the annular element eventually into a drain reservoir.

In accordance with another aspect of the present invention, a method of cleaning an exhaust manifold of a coating apparatus is defined so that airborne coating material that flows from a process chamber of the coating apparatus and passes into the exhaust stream and which deposits within the exhaust manifold can be removed. The method is applicable to an exhaust manifold comprising at least one exhaust conduit and a rinse tube running within the inside of the exhaust conduit over at least a portion of its length and having plural orifices along its length, the method including connecting a cleaning supply to the rinse tube, and supplying that cleaning solution over a period of time from the supply to the rinse tube for dispensing the cleaning solution from the tube orifices and impinging cleaning solution on at least a portion of the interior surface of an exhaust conduit.

Preferably, the method includes the cleaning of plural exhaust conduits leading into a collector body and supplying cleaning solution to rinse tubes within each of the exhaust conduits. Moreover, nozzles are preferably provided on the supply manifold within the exhaust manifold so that cleaning solution can also be sprayed onto a fluid separator device preferably provided downstream of the exhaust manifold. Thus, the method also preferably includes the step of separating the cleaning fluid by the fluid separator device, collecting the separated fluid and draining the fluid to a drain reservoir.

DETAILED DESCRIPTION OF THE PREFERRED EMBODIMENTS

Figure 1:
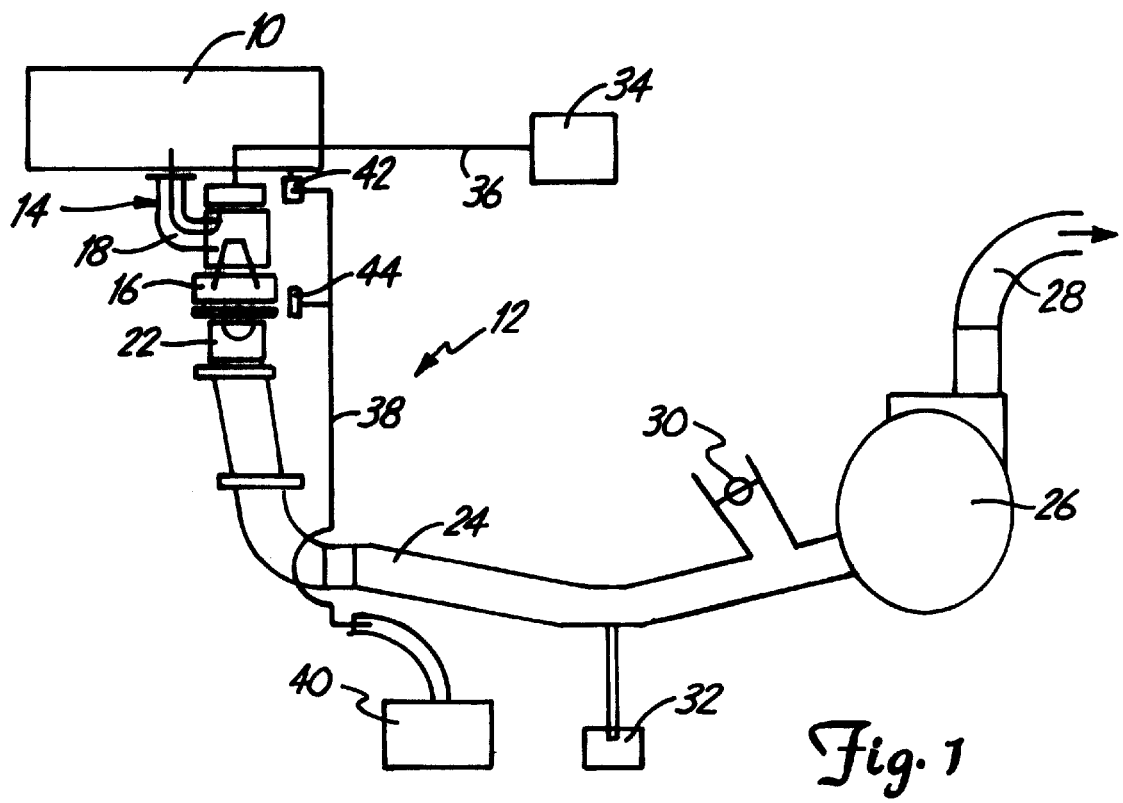
FIG. 1 is a schematic view of an exhaust system connected with a coating apparatus and including an exhaust manifold in accordance with the present invention.

With reference now to the several Figures, wherein like components are labeled with like numerals throughout the several Figures, and initially to FIG. 1, a coating apparatus 10 is schematically illustrated connected with an exhaust system 12.

The exhaust system 12 comprises an exhaust manifold 14 having an integral rinsing mechanism in accordance with the present invention and which is connected to a fluid separator 16. The exhaust manifold 14 is connected to the coating apparatus 10 via exhaust pipes 18 and 20 (only exhaust pipe 18 is shown in FIG. 1). The bottom side of the fluid separator device 16 is subsequently connected with a damper valve 22 for controlling the airflow through the exhaust manifold 14 and fluid separator device 16. From there, the exhaust system 12 comprises sufficient piping 24 to be eventually connected with an exhaust blower 26 from which exhaust air is expelled through the end conduit 28. Illustrated just prior to the exhaust blower 26 is a controlled leak valve 30 as conventionally known, and prior to that a trap reservoir 32 into which any liquid within that portion of the pipe can be drained. The present invention is likewise applicable to other exhaust system types, including other negative pressure and positive pressure systems.

A cleaning solution supply 34 is shown connected to the exhaust manifold 14 by way of line 36. As will be more fully described below, cleaning fluid provided to the exhaust manifold 14 is used for cleaning the exhaust pipes 18 and 20 and the fluid separator device 16.

A drain line 38 is also shown in FIG. 1 running to a drain reservoir 40 from a first drain 42 of the coating apparatus 10 and a second drain 44 of the fluid separator device 16. In accordance with the present invention, and as will be described more fully below, the fluid separator device 16 removes excess process fluid as well as cleaning solution provided within the exhaust manifold 14 from the exhaust stream. The fluid separated from the exhaust stream is collected and drained through drain 44 into the drain line 38 which is conventionally known to be provided itself for the purpose of draining excess fluids from the coating apparatus 10 to the drain reservoir 40.

Figure 2:
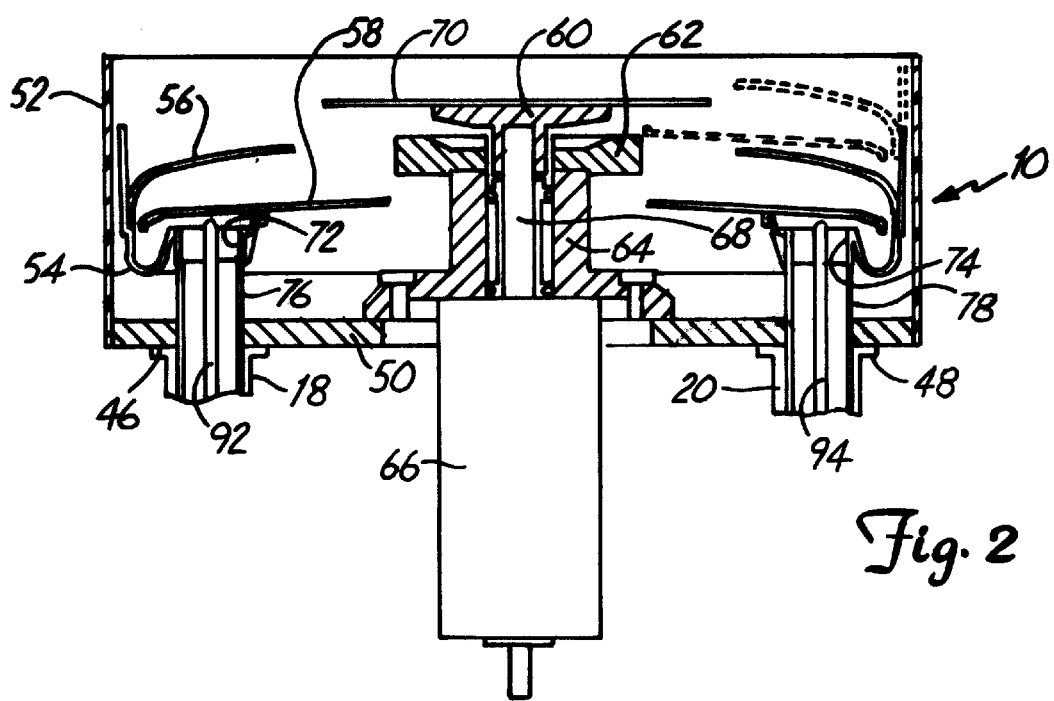
FIG. 2 is a simplified cross-sectional view taken through a coating apparatus connected to an exhaust manifold in accordance with the present invention.

With reference now to FIG. 2, portions of exhaust pipes 18 and 20 are illustrated connected to the bottom of the coating apparatus 10. The exhaust pipes 18 and 20 include flange portions 46 and 48 for the purpose of conventional connection with a bottom wall 50 of a tub assembly 52 of the coating apparatus 10. Any number of exhaust pipes or conduits may be provided as determined by each particular application and coating apparatus design. Alternatively the exhaust pipes can be integrally formed with the coating apparatus.

The coating apparatus 10 includes the tub assembly 52 which surrounds an annular cup 54 supported within the tub assembly 52 in a known manner and to be movable between the solid position and the dotted position shown in FIG. 2. The manner of movement is not important to the present invention. Also provided to move with the cup 54 are a deflector 56 and a baffle 58. The coating apparatus itself does not form a specific part of the present invention except that a simplified coating apparatus is illustrated in FIG. 2 to show an example which can be used with the exhaust manifold and fluid separator device of the present invention.

Also within the tub assembly 52, a rotatable chuck 60 is supported by a head 62 and a motor mount 64. Within the head 62 and motor mount 64, a motor shaft 68 is driven by motor 66 for rotating the chuck 60. Chuck 60 is also typically provided with vacuum at its upper surface for positioning and supporting an object such as a semiconductor wafer 70. The chuck 60 can also be shifted up and down instead of the cup 54, as is also known.

Exhaust ports 72 and 74 are provided within the cup 54 and include extension portions 76 and 78 respectively, which slidingly extend into the exhaust pipes 18 and 20, respectively. The extension portions 76 and 78 are sufficiently long so that when the cup 54, deflector 56 and baffle 58 assembly is moved to its upward dotted line position, the extensions 76 and 78 still extend within a portion of the exhaust pipes 18 and 20, respectively. Also provided, but not shown, within the cup 54 at a low point thereof, is a drain (schematically illustrated as 42 in FIG. 1) for draining excess fluids from the cup 54.

The operation of the coating apparatus 10, as exemplified by the apparatus shown in FIG. 2, is as follows. An object such as the semiconductor wafer 70 is loaded into the coating apparatus 10 while the cup 54, deflector 56 and baffle 58 assembly is in its lower position shown in FIG. 2. The wafer 70 is placed upon the chuck 60 which typically includes vacuum at its surface for holding the wafer. Then, the cup 54, deflector 56 and baffle 58 assembly is raised to the phantom position shown in FIG. 2 and the chuck 60 and thus wafer 70 are rotated at a predetermined speed. Then, coating material is deposited from above by a nozzle (not shown) onto the top surface of the wafer 70 while it is spinning. This action causes a controlled coating of the upper surface of the wafer 70. During the coating operation, a negative pressure is established within the exhaust system, such as by the exhaust blower 26 shown in FIG. 1, so that air flows over the wafer 70 through exhaust ports 72 and 74 and into the exhaust pipes 18 and 20. As set out in the Background section above, coating material (in the form of liquid droplets) becomes airborne within the air flow as a result of the spinning operation. Some of the coating material may deposit on the surfaces of the cup 54, deflector 56 and the baffle 58 while airborne droplets of coating material are also carried into the exhaust stream through the exhaust ports 72 and 74. The airborne droplets also deposit about the exhaust ports 72 and 74 and onto the interior surfaces of the exhaust system. Once a wafer 70 is coated, the cup 54, deflector 56 and baffle 58 assembly can be lowered and the wafer 70 removed leaving the coating apparatus 10 ready for a next similar operation.

The result of this type of coating operation over the course of coating a number of wafers is the eventual buildup of coating material on the cup 54, deflector 56, baffle 58, exhaust ports 72 and 74 and the internal surfaces of the exhaust pipes 18 and 20 and subsequent pipe of the exhaust system. In order to periodically clean the surfaces of the cup 54, deflector 56 and baffle 58, devices have been developed for spraying these surfaces with cleaning solution to remove deposited coating material and prevent contamination caused by this coated material within a subsequent process. No such device is shown in FIG. 2 but may be provided in the illustrated coating apparatus 10 if desired in conjunction with the present invention.

Figure 3:
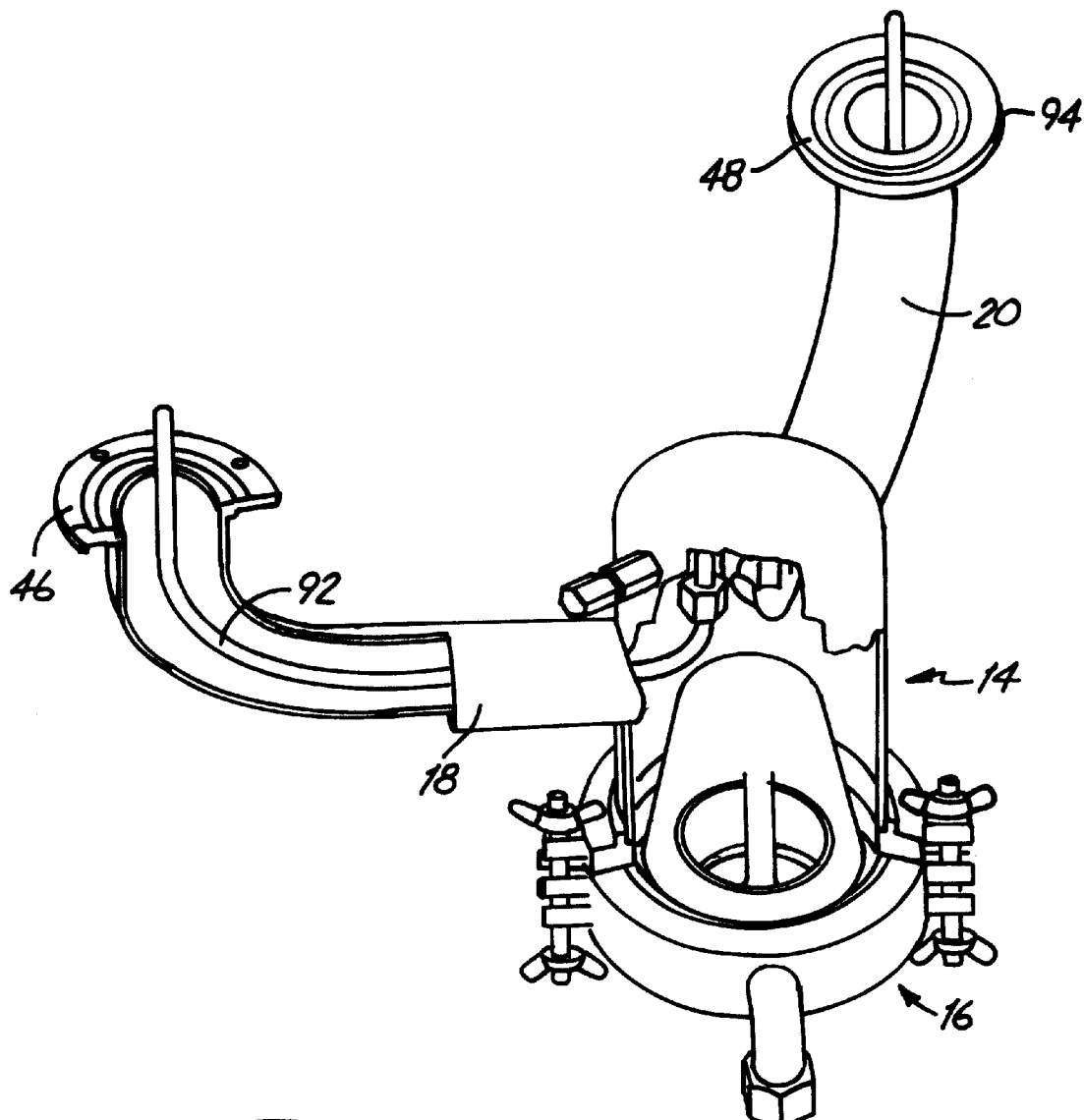
FIG. 3 is a perspective view of an exhaust manifold in accordance with the present invention comprising two exhaust pipes with an integral rinsing mechanism and a fluid separator device.
Figure 4:
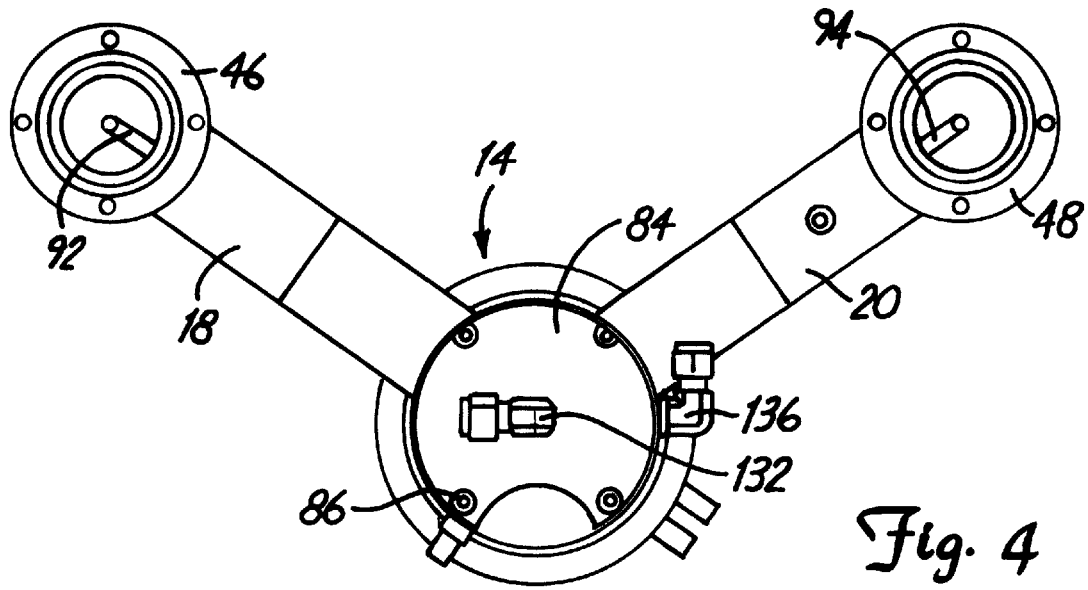
FIG. 4 is a top view of an exhaust manifold including an integral rinsing mechanism in accordance with the present invention.

In order to keep the exhaust system clean, a rinsing mechanism integral with the exhaust manifold 14 has been developed. With reference to FIG. 3, an exhaust manifold 14 is illustrated combined with a fluid separator device 16. The exhaust manifold 14 includes an integral rinsing mechanism which is further described below. FIGS. 4–7 show the exhaust manifold 14 and its integral rinsing mechanism.

The exhaust manifold 14 comprises the exhaust pipes 18 and 20 which are each connected with a common collector body 80. The collector body 80 includes a connection flange 82 for connection with the fluid separator device 16, and at its other end, the collector body is connected with a supply manifold 84. The supply manifold 84 is preferably connected to the collector body 80 by machine screws 86 (see FIG. 4) and by way of a spacer gasket 88 between the collector body 80 and the supply manifold 84. Other means are contemplated for connecting the supply manifold 84 to the collector body 80; however, it is preferable that they be separable from one another. As to the other connections of the exhaust manifold 14, such as where exhaust pipes 18 and 20 connect with the collector body 80 and where the connection flange 82 connects with the collector body 80, it is preferable that the connections be more permanent, although not necessarily, and may include any conventional connection technique such as, for example, welding.

Figure 5:
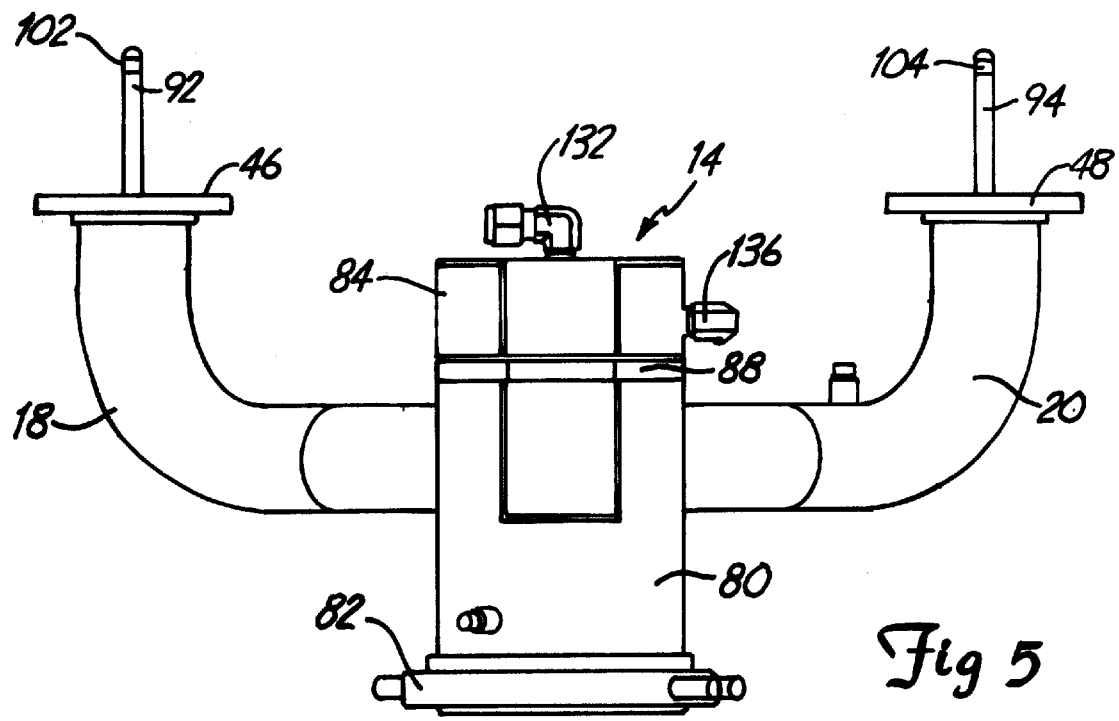
FIG. 5 is a front view of the exhaust manifold and rinsing mechanism of FIG. 4.
Figure 6:
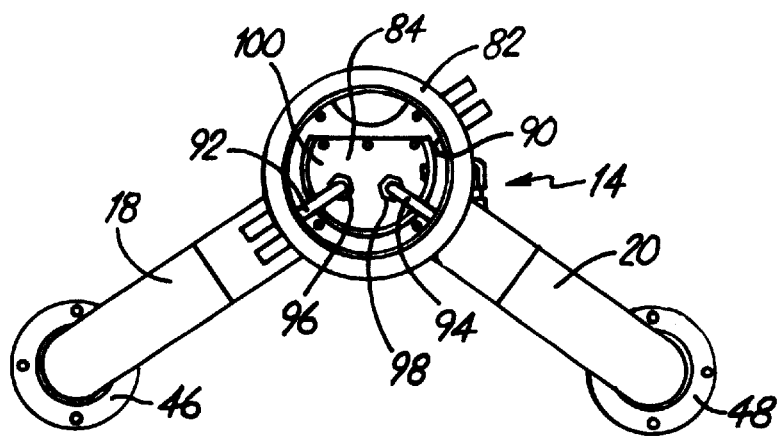
FIG. 6 is a bottom view of the exhaust manifold and rinsing mechanism of FIGS. 4 and 5.
Figure 7:
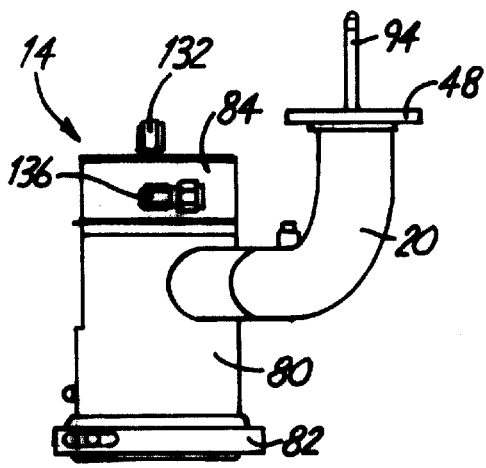
FIG. 7 is a side view of the exhaust manifold and rinsing mechanism of FIGS. 4–6.

As seen in FIG. 6, the collector body 80 provides an internal cavity 90 which is closed at the upper end by the supply manifold 84. The interiors of the exhaust pipes 18 and 20 open into the internal cavity 90 of the collector body 80. The internal cavity 90 is otherwise closed except that it opens through the connection flange 82. A side depression is illustrated within FIGS. 4–7 within both the collector body 80 and the supply manifold 84. This depression is formed in order to provide a clearance for other components of the coating apparatus 10. The depression is, however, sealed so that the internal cavity 90 is closed.

Included within the exhaust pipes 18 and 20 are perforated rinse tubes 92 and 94, respectively. The rinse tubes 92 and 94 preferably extend coaxially throughout the entire length of the exhaust pipes 18 and 20 and into the internal cavity 90 of the collector body 80. As shown in FIG. 6, the inner ends of both rinse tubes 92 and 94 are shown connected by fittings 96 and 98 to a bottom surface 100 of the supply manifold 84. The supply manifold 84 provides passages for connection to the rinse tubes 92 and 94 in a manner described more fully below. The other ends of the rinse tubes 92 and 94, shown best in FIG. 5, preferably extend out from the exhaust pipes 18 and 20 to a point significantly above the mounting flanges 46 and 48, respectively. The rinse tubes 92 and 94 are preferably made of a rigid bendable material (such as steel, aluminum, stainless steel tubing), and thus can extend through the exhaust pipes 18 and 20 and out therefrom without further support along their length. That is, by the connections at fittings 96 and 98 to the supply manifold 84, the rinse tubes 92 and 94 are fully supported throughout their entire length. Other connections can be provided along the length within the exhaust pipes 18 and 20, for example, but are not preferred in that they provide further obstructions to the exhaust flow upon which coating material may deposit.

The rinse tubes 92 and 94 themselves preferably comprise hollow tubing with orifices along their entire length. The orifices connect from their hollow interior through the tube walls to provide spray orifices from which cleaning solution can be dispensed when supplied thereto under pressure. Controlled impingement of cleaning fluid on the surfaces of the exhaust pipes can thus be accomplished at least in part by the arrangement and number of orifices. The orifices are preferably arranged radially about the surfaces of the rinse tubes 92 and 94 so that cleaning solution can be dispensed to cover all internal surfaces of the exhaust pipes 18 and 20 as well as the interior surface of the collector body 80 which defines the internal cavity 90. The number and position of the orifices can be varied depending on the cleaning solution dispensed, the pressure under which the solution is supplied, and the type of coating material that is to be washed from the exhaust system surfaces.

Figure 8:
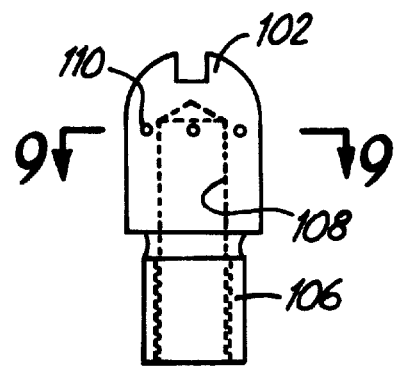
FIG. 8 is an enlarged side view of an endcap nozzle provided at the end of the perforated rinse tubes for directing cleaning solution at the inlets of the exhaust pipes.
Figure 9:
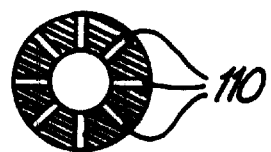
FIG. 9 is a cross sectional view taken along line 9—9 of FIG. 8.

Referring back to FIG. 2, it can be seen that the rinse tubes 92 and 94 preferably extend sufficiently above the flanges 46 and 48 so that when the cup 54 is in its lowermost position, the ends of rinse tubes 92 and 94 preferably extend just slightly above the exhaust ports 72 and 74 thereof. Thus, cleaning solution can be sprayed also partially within the process chamber to the exhaust ports 72 and 74 and within the internal surfaces of the extension portions 76 and 78 that extend from the bottom of cup 54. To facilitate the dispensing of cleaning solution at the exhaust ports, endcap nozzles 102 and 104 are preferably provided at the ends of rinse tubes 92 and 94 respectively, as shown in FIG. 5. An enlarged side view of the endcap nozzle 102 is illustrated in FIGS. 8 and 9. The endcap nozzle 102 comprises a reduced diameter portion 106 which is sized to be inserted in the end of rinse tube 92. An internal cavity 108 is defined therein which opens through spray orifices 110. The spray orifices 110 are preferably arranged in a radial pattern as shown in FIG. 9, the number of orifices 110 can be varied depending on the ability to adequately dispense and cover the exhaust ports. It is not necessary that the rinse tubes 92 and 94 extend partially into the process chamber, or for that matter, along the entire length of the exhaust pipes 18 and 20. Total coverage is preferred for more complete cleaning.

Figure 18:
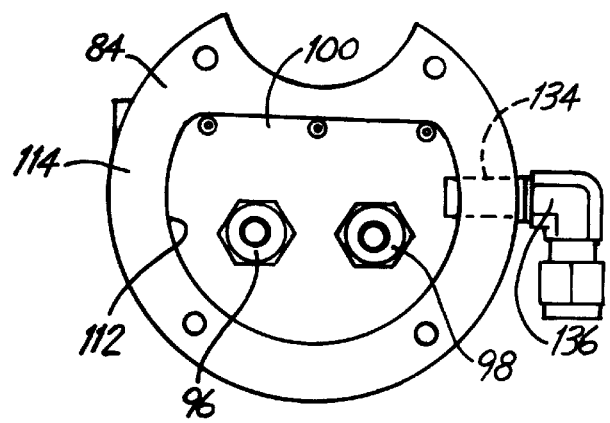
FIG. 18 is a bottom side view of the supply manifold of FIG. 17 showing the position of the connectors for connection to the rinse tubes and the spray nozzles for the fluid separator device.
Figure 19:
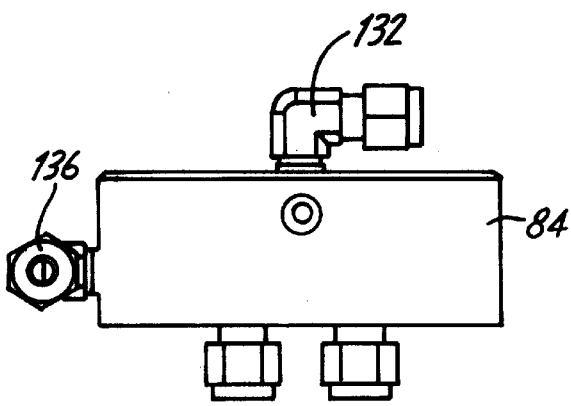
FIG. 19 is a front view of the supply manifold of FIG. 17.
Figure 20:
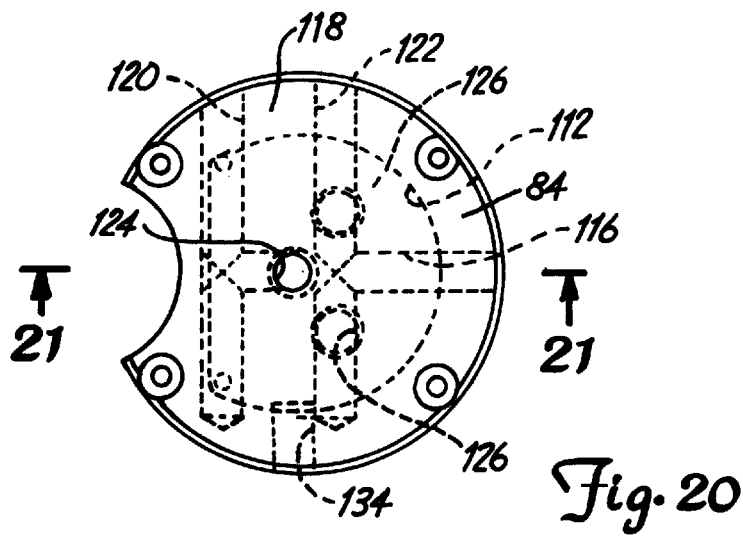
FIG. 20 is a top view similar to FIG. 17 except without the line connectors and with the passages within the manifold shown in phantom illustrating the manner of supply therein to the set of nozzles and the rinse tubes.
Figure 21:
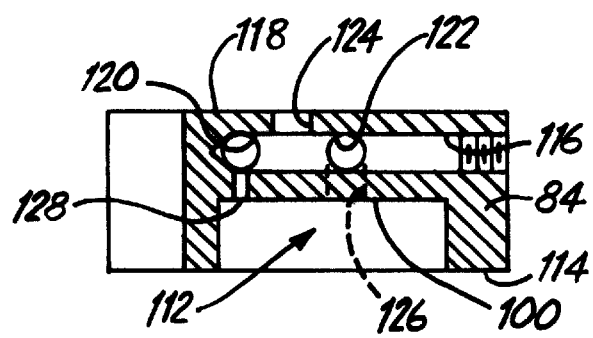
FIG. 21 is a cross sectional view taken along line 21—21 of FIG. 20.
Figure 22:
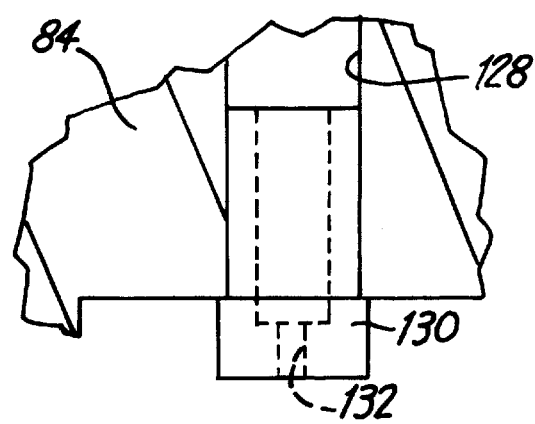
FIG. 22 is an enlarged view of a portion of the cross section of the supply manifold shown in FIG. 21 showing a nozzle provided within a nozzle supply passage.

With reference to FIGS. 17–22, the supply manifold 84 is illustrated. In FIGS. 20 and 21, all connection fittings have been omitted to show the passages therein more clearly. The supply manifold 84 is preferably constructed from a single body to include a recessed bottom area 112 within which the bottom surface 100 is provided. Surrounding the bottom surface 100 is a perimeter wall 114, the bottom surface of which connects to an upper perimetric surface of the collector body 80, preferably via the spacer gasket 88. As shown in FIGS. 20 and 21, a first passage 116 is provided extending most of the way through the supply manifold 84 and in the body thereof between the bottom surface 100 and a top surface 118. Second and third passages 120 and 122 are also provided preferably at 90 degrees to the first passage 116, to intersect the first passage 116 at two different points along its length. Thus, as shown by the phantom lines in FIG. 20, passages 120 and 122 can communicate with one another via a portion of the passage 116. A supply opening 124 is provided preferably through the top wall 118 and into the first passage 116 intermediate of the second and third passages 120 and 122. The ends of passages 116, 120 and 122 are also plugged (see, for example, passage 116 in FIG. 21) so that fluid supplied through the supply opening 124 is provided to portions of passages 116, 120 and 122 to thereby define a supply manifold. Many other manifold arrangements are possible to provide fluid communication as needed and as detailed more below.

Figure 17:
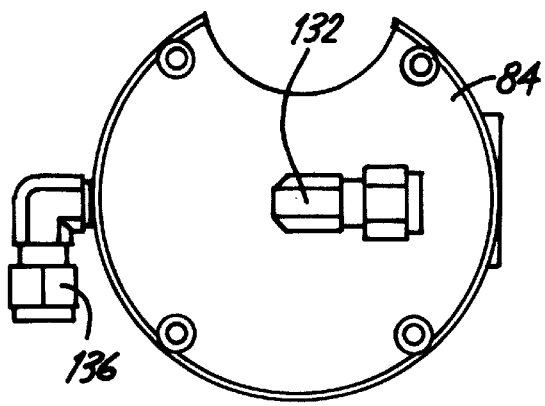
FIG. 17 is a top view of a supply manifold for the supply of cleaning solution to the perforated rinse tubes and nozzles for cleaning the fluid separator device.

Outlet openings 126 are provided extending through the bottom wall 100 and opening into the third passage 122. The outlet openings 126 are preferably threaded and provide the means by which the fittings 96 and 98 of the perforated rinse tubes 92 and 94, respectively, can be connected. Another series of openings are provided through the bottom surface 100 and into the second passage 120. Three openings are illustrated, although more or less can be provided and the arrangement thereof can be varied depending on the specific application. The purpose of the openings 128 is for mounting a like number of nozzles 130 therein. Nozzle 130 can be threaded, for example, into the openings 128, see FIG. 22, and each nozzle 130 provides a spray orifice 132 from which cleaning solution can be adequately dispensed. The size and number of nozzles 130 can be varied depending on a specific application. As shown in FIG. 17 and 19, a supply fitting 132 provides the connection from a pressurized supply line (not shown) to the supply opening 124 and subsequently within passages 116, 120 and 122. Then, fittings 96 and 98 permit fluid communication from within passage 122 to the perforated rinse tubes 92 and 94, respectively, while passage 120 provides fluid communication through nozzles 130. By this manifold construction, fluid can be supplied to both perforated rinse tubes 92 and 94 and sprayed from nozzles 130.

Yet another passage 134 is preferably provided through the perimeter wall 114 to provide communication from within the recessed area 112 to yet another fluid connection fitting 136 (see FIG. 18). The fitting 136 can then be connected with another line to be used for monitoring the pressure within the recessed area 112 and thus generally the pressure within the internal cavity 90 of the exhaust manifold 14. This pressure information can advantageously be used in the control of airflow through the exhaust system 12.

Figure 10:
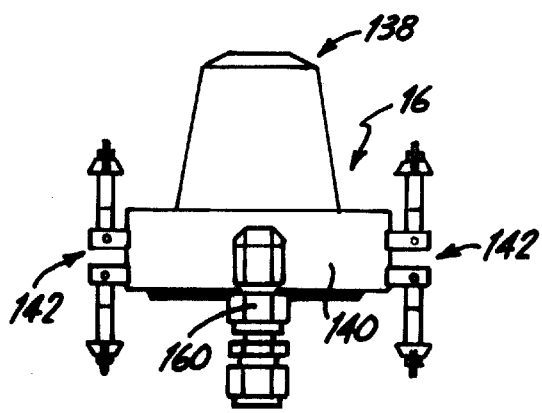
FIG. 10 is a front view of a fluid separator device in accordance with the present invention and which is to be connected with the exhaust manifold with its integral rinsing mechanism.
Figure 11:
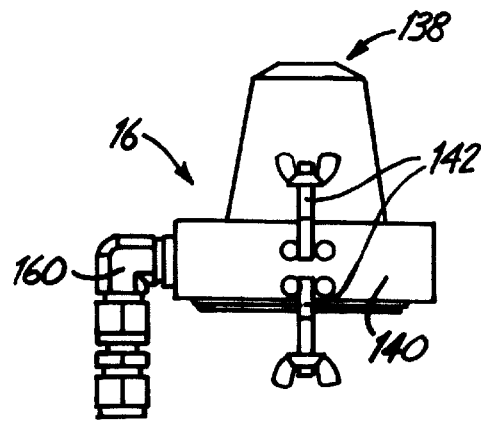
FIG. 11 is a side view of the fluid separator device of FIG. 10.
Figure 12:
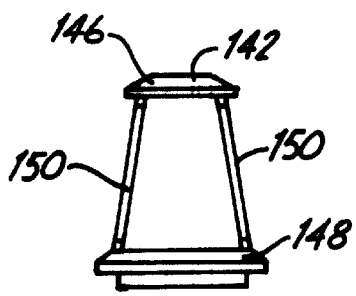
FIG. 12 is a side view of a support structure to be provided with a screen as a component of the fluid separator device.
Figure 13:
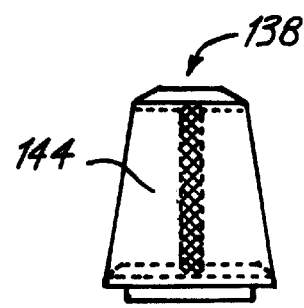
FIG. 13 shows the support structure combined with a screen for use in a fluid separator device.

In FIGS. 10 and 11, the fluid separator device 16 is illustrated separated from the exhaust manifold 14. The fluid separator device 16 comprises a tapered screen assembly 138 and a fluid trap 140. The fluid trap 140 connects to the bottom side of the exhaust manifold 14 by connector mechanisms 142 and supports the tapered screen assembly 138 within the exhaust stream. The other side of the fluid trap 140 connects with the remainder of the exhaust system. Connectors 142 are preferably of the type including a number of articulated threaded pins onto which wing nuts can be provided to engage with fixed pins of the elements at either side thereof. Other conventional connector mechanisms, preferably which permit separation, are also contemplated. As shown in FIG. 12, the tapered screen assembly 138 comprises a support structure 142 about which a screen 144 is wrapped. The screen 144 can be connected to the support structure 142 by adhesives, mechanical fasteners, heat fusion, or the like. The support structure 142 itself comprises a top disk portion 146, a lower annular ring portion 148 and a pair of struts 150 connecting the top disk portion to the bottom annual ring portion 148. More or fewer struts 150 can be provided. The support structure 142 is designed so that when the screen is attached thereto and the annular ring portion 148 is supported by the fluid trap 140, exhaust air must flow through the screen 144 and then through a central opening of the annular ring portion 148. Moreover, the design is such that the screen 144 is supported to provide a tapered screen assembly through which the exhaust air passes. The screen is preferably tapered to enhance the ability to remove the fluid droplets from the exhaust air and so that the fluid will run along the screen 144 toward the annular ring portion 148.

Figure 14:
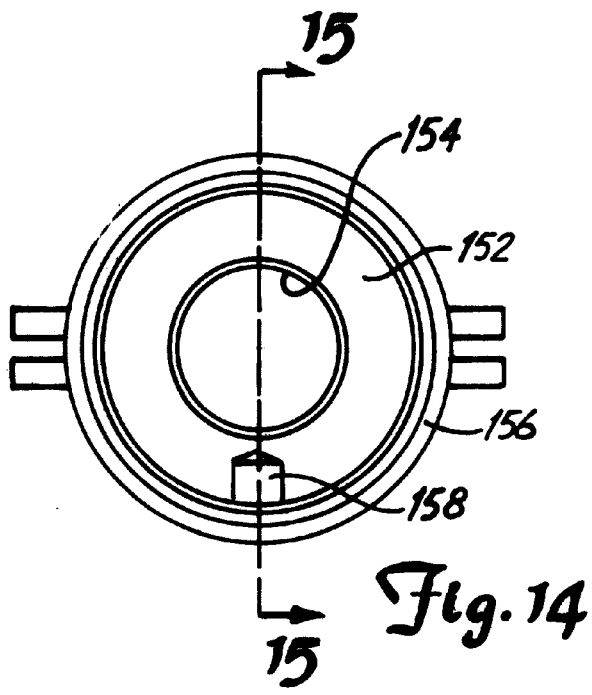
FIG. 14 is a top view of a collector body which with the screen and support structure comprise the fluid separator device.
Figure 15:
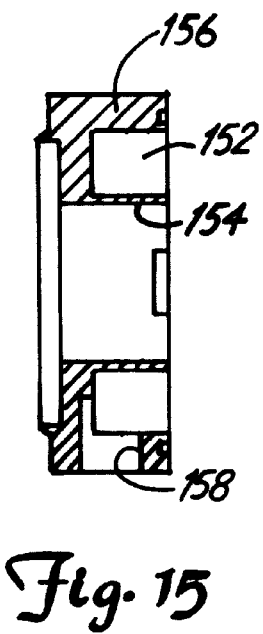
FIG. 15 is a cross sectional view taken along line 15—15 in FIG. 14.
Figure 16:
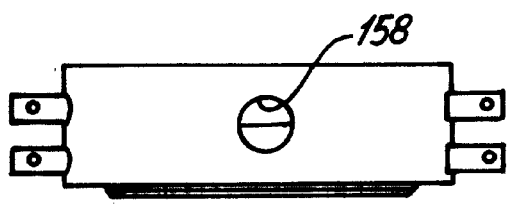
FIG. 16 is a front view of the collector body of FIG. 14.

The annular ring portion 148 is supported by the fluid trap 140 within an annular recess 152 shown in FIGS. 14 and 15. The annular recess 152 is defined by an internal wall 154 and external wall 156. The internal wall 154 also defines a central through opening through which exhaust air passes from the annular ring portion 148 and into the remainder of the exhaust system. The annular recess 152 not only provides a support for the tapered screen 138 but also provides a collector of the fluid trap wherein any fluid separated from the exhaust stream and which is removed by the tapered screen assembly 138 pools. A drain opening 158 passes through the external wall 156 to provide a drain through which fluid collected within the annular recess 152 can pass to another fluid connector fitting 160, which in turn can be connected with a drain line (not shown) and run to a drain reservoir.

By the above construction, an exhaust manifold 14 and fluid separator device 16 can be combined with one another in a way to not only remove fluids from the exhaust stream, but also to provide a rinsing mechanism which can be periodically provided. The rinsing can be controlled manually, such as by a on/off valve structure, or may include automatic controls for causing a rinsing operation based on any number of factors. Factors can include number of cycles of the coating apparatus, on a time basis, based on a measurement of the coating material deposited within the exhaust system, or other changes. For example, flow through the exhaust system can be monitored and the rinsing process can be initiated based on a percentage reduction of airflow.

A rinsing operation occurs as follows. Pressurized cleaning solution can be supplied to the supply manifold 84 via the fluid connector fitting 136. The supply of pressurized cleaning solution can be triggered by any of the happenings noted above. The pressurized cleaning solution would then fill the portions of passages 116, 120 and 122 of the supply manifold 84. From passage 122, cleaning solution would be supplied through outlet openings 126 through fittings 96 and 98 and into the perforated rinse tubes 92 and 94, respectively. At the same time, pressurized cleaning solution would flow through outlet openings 128 and through the nozzles 130 provided in a series from the bottom surface 100 of the supply manifold 84. Cleaning solution would then be sprayed from the perforated rinse tubes 92 and 94, preferably along the entire length of the exhaust pipes 18 and 20, onto the exhaust ports 72 and 74 and within the extension portion 76 and 78. Some spray from the internal most ends of the rinse tubes 92 and 94 would also spray cleaning solution onto the surfaces of the internal cavity 90 within the collector body 80. Also, the nozzles 130 spray cleaning solution to the internal cavity 90, and more specifically are preferably directed to spray onto the tapered screen assembly 138 to clean residual coating material that may have dried thereon.

The cleaning operation is preferably conducted while the exhaust system is closed just downstream of the fluid separator device 16, such as by a damper control valve shown at 22 in FIG. 1. Then, the cleaning solution and dissolved coating material can be removed from the system by the fluid separator device 16. This is done by permitting an airflow through the system, whereby the tapered screen assembly 138 separates fluid from the exhaust stream to run into the annular recess 152 of the fluid trap 140 and out through drain opening 158 and into a system drain. A system drain is typically provided in order to also drain excess fluids from the cup 54 of the coating apparatus, described above. Cleaning solutions used are dependent on the type of material which is coated in the coating apparatus 10. For example, with a water based coating such as the top anti-reflective coating known as Aquatar™, the cleaning fluid solution preferably comprises water. For coatings incorporating organic solvents, organic cleaning solutions may be necessary.

By the present invention, exhaust performance can be maintained without shutting down the coating apparatus. That is, the rinsing operation can be performed, for example, between cycles of the coating apparatus. Moreover, the frequency and amount of rinsing is easily adjustable.

Furthermore, the rinsing operation is performed without any disassembly of the exhaust system. Also by the present invention, the fluids, both process coating fluids and cleaning solutions, are separated from the exhaust prior to subsequent exhaust control mechanisms such as the damper control valve and exhaust blowers.

The present invention is applicable to any situation where exhaust supply and control needs to be maintained in an environment where airborne materials are entrained into the exhaust system. Again, the cleaning solution can be any fluid that can be adequately sprayed to the surface of the exhaust system where airborne may deposit and which can dissolve and/or loosen the materials for separation from the exhaust stream.

We claim:

1. An exhaust manifold for connection to a coating apparatus and through which an exhaust stream from the coating apparatus which contains airborne coating material passes to a further exhaust system, said exhaust manifold comprising:

at least one exhaust conduit having an interior surface and a connector at a first end thereof for connection to the coating apparatus, the interior surface opening through the connector to provide an inlet at said first end, and a rinse tube running within the inside of said exhaust conduit from a point substantially adjacent its inlet and over at least a portion of its length, said rinse tube having a first end connectable to a supply of cleaning solution and including plural orifices along a length thereof so that cleaning solution supplied to the rinse tube can be dispensed from said orifices to impinge at least a portion of the interior surface that is adjacent to the inlet of said exhaust conduit.

2. An exhaust manifold for connection to a coating apparatus and through which an exhaust stream from the coating apparatus which contains airborne coating material passes to a further exhaust system, said exhaust manifold comprising:

at least one exhaust conduit having an interior surface and a connector at a first end thereof for connection to the coating apparatus, a rinse tube running within the inside of said exhaust conduit over at least a portion of its length, said rinse tube having a first end connectable to a supply of cleaning solution and including plural orifices along a length thereof so that cleaning solution supplied to the rinse tube can be dispensed from said orifices to impinge at least a portion of the interior surface of said exhaust conduit, and a fluid separator device provided downstream from said exhaust manifold for removing fluid from within the exhaust stream, collecting the removed fluid and draining the collected fluid.

3. The combination of claim 2, wherein said exhaust manifold further comprises a collector body having an internal cavity connected with the at least one exhaust conduit and said collector body is further connected with said fluid separator device.

4. The combination of claim 3, wherein said exhaust manifold includes plural exhaust conduits, each connected to said collector body and connectable to the coating apparatus.

5. The combination of claim 4, wherein each exhaust conduit includes a rinse tube running therein, each rinse tube having a first end connectable to a supply of cleaning solution and including plural orifices along a length thereof so that cleaning solution supplied to a rinse tube can be dispensed from its orifices to impinge at least a portion of the interior surface of the exhaust conduit that surrounds it.

6. The combination of claim 5, wherein the rinse tubes are connected to a common supply manifold which is connectable to the supply of cleaning solution.

7. The combination of claim 6, wherein said common supply manifold is connected to one side of said collector body to close off said internal cavity thereof while another side of said collector body is connected to said fluid separator device, said supply manifold includes a passage therein in fluid communication with said rinse tubes, and said rinse tubes are supported within said exhaust manifold by connections thereof to said supply manifold.

8. The combination of claim 7, wherein said supply manifold further supports at least one nozzle in fluid communication with its passage through which cleaning solution can be sprayed onto said fluid separator device.

9. The combination of claim 8, wherein said supply manifold includes plural passages in fluid communication with one another, and said nozzle opens into a different passage than the rinse tubes.

10. The combination of claim 9, further including plural nozzles that connect to a common passage of said supply manifold.

11. The combination of claim 7, wherein said rinse tubes extend within and along the entire lengths of the exhaust conduits.

12. The combination of claim 11, wherein at least one of said rinse tubes extends beyond the first end of its exhaust conduit.

13. The combination of claim 12, further including an end cap nozzle at the end of the rinse tube that extends beyond its exhaust conduit for spraying cleaning solution within a chamber of a coating apparatus when connected thereto.

14. The combination of claim 13, wherein said fluid separator comprises a tapered screen assembly supported by a fluid trap, and said fluid trap is connected to said collector body.

15. The combination of claim 14, wherein said fluid trap further comprises an annular element having an annular recess, said tapered screen assembly is supported within said annular recess, and a drain opening is provided through said annular element into said annular recess.

16. A method of cleaning coating material from within an exhaust manifold of a coating apparatus, wherein an exhaust stream containing airborne coating material flows from a process chamber of the coating apparatus and passes to a further exhaust system, the exhaust manifold comprising at least one exhaust conduit having an interior surface on which airborne coating material deposits and a connector at a first end thereof for connection to the coating apparatus, and a rinse tube running within the inside of the exhaust conduit over at least a portion of its length and including plural orifices along a length thereof, said method comprising the steps of:

connecting a cleaning solution supply to the rinse tube;
   supplying cleaning solution for a period of time from the supply to the rinse tube; and
   removing deposited coating material from the interior surface of the exhaust conduit by dispensing the cleaning solution from the orifices for impinging on at least a portion of the interior surface of the exhaust conduit.

17. A method of cleaning an exhaust manifold of a coating apparatus, wherein an exhaust stream containing airborne coating material flows from a process chamber of the coating apparatus and passes to a further exhaust system, the exhaust manifold comprising at least one exhaust conduit having an interior surface and a connector at a first end thereof for connection to the coating apparatus, and a rinse tube running within the inside of the exhaust conduit over at least a portion of its length and including plural orifices alone a length thereof said method comprising the steps of:

connecting a cleaning solution supply to the rinse tube;

supplying cleaning solution for a period of time from the supply to the rinse tube and dispensing the cleaning solution from the orifices for impinging on at least a portion of the interior surface of the exhaust conduit; and separating cleaning solution from the exhaust stream by a fluid separator device provided downstream from the exhaust manifold.

18. The method of claim 17, further comprising the step of draining the cleaning fluid that is separated from the exhaust stream to a drain reservoir.

19. The method of claim 18, wherein the supplying step further includes supplying the cleaning solution to a common supply manifold of the exhaust manifold, supplying cleaning solution to a plurality of rinse tubes provided in fluid communication with the common supply manifold, and thereby impinging cleaning solution on a plurality of exhaust conduits of the exhaust manifold.

20. The method of claim 19, wherein the supplying step further includes supplying the cleaning solution to the common supply manifold of the exhaust manifold, supplying cleaning solution to at least one nozzle in fluid communication with the common supply manifold, and thereby spraying cleaning solution on the fluid separator device.

21. The method of claim 20, wherein the supplying step further includes spraying the cleaning solution from a distal end of at least one of the rinse tubes and thereby impinging cleaning solution onto a portion of the process chamber of the coating apparatus.

22. The method of claim 21, wherein the supplying step is conducted on a periodic basis.

23. The method of claim 22, wherein the supplying step is controlled to occur automatically on a cyclic basis.

24. The method of claim 22, wherein the supplying step is controlled manually.

* * * * *

UNITED STATES PATENT AND TRADEMARK OFFICE
CERTIFICATE OF CORRECTION

PATENT NO. : 5,972,078
DATED : October 26, 1999
INVENTOR(S) : Collins, et. al.

It is certified that error appears in the above-identified patent and that said Letters Patent is hereby corrected as shown below:

Title page, item [73], Assignee: delete "Mich." and insert therefor -- Minn.--

Signed and Sealed this

Twenty-seventh Day of February, 2001

Attest:

NICHOLAS P. GODICI

Attesting Officer     *Acting Director of the United States Patent and Trademark Office*